US008612128B2

(12) United States Patent
Herman et al.

(10) Patent No.: US 8,612,128 B2
(45) Date of Patent: Dec. 17, 2013

(54) GROUND THREAT LOCATION FOR AN AIRCRAFT USING BURST RECOGNITION

(75) Inventors: Carl R. Herman, Owego, NY (US); Stephen C. Moraites, Owego, NY (US)

(73) Assignee: Lockheed Martin Corporation, Bethesda, MD (US)

(*) Notice: Subject to any disclaimer, the term of this patent is extended or adjusted under 35 U.S.C. 154(b) by 0 days.

(21) Appl. No.: 13/346,113

(22) Filed: Jan. 9, 2012

(65) Prior Publication Data
US 2013/0179063 A1 Jul. 11, 2013

(51) Int. Cl.
*G05D 1/00* (2006.01)
*G01S 1/08* (2006.01)

(52) U.S. Cl.
USPC .......................... 701/300; 342/386; 342/451

(58) Field of Classification Search
USPC .............. 701/3, 300; 342/452, 386, 385, 450, 342/451, 457, 458, 459; 367/124, 126, 128, 367/906
See application file for complete search history.

(56) References Cited

U.S. PATENT DOCUMENTS

| | | |
|---|---|---|
| 3,936,822 A | 2/1976 | Hirschberg |
| 4,138,660 A | 2/1979 | Hill |
| 5,291,199 A | 3/1994 | Overman et al. |
| 5,339,281 A | 8/1994 | Narendra et al. |
| 5,544,129 A | 8/1996 | McNelis |
| 5,781,505 A | 7/1998 | Rowland |
| 5,831,936 A | 11/1998 | Zlotnick et al. |
| 6,178,141 B1 | 1/2001 | Duckworth et al. |
| 6,621,764 B1 | 9/2003 | Smith |
| 6,847,587 B2 | 1/2005 | Patterson et al. |
| 6,965,541 B2 | 11/2005 | Lapin et al. |
| 7,203,132 B2 | 4/2007 | Berger |
| 7,233,546 B2 | 6/2007 | Berkovich et al. |
| 7,266,045 B2 | 9/2007 | Baxter et al. |
| 8,009,515 B2 * | 8/2011 | Cecala et al. ................. 367/124 |
| 2006/0028374 A1 | 2/2006 | Fullerton |
| 2007/0125951 A1 | 6/2007 | Snider et al. |
| 2008/0133070 A1 * | 6/2008 | Herman ............................ 701/4 |

(Continued)

FOREIGN PATENT DOCUMENTS

EP 0747722 11/1996

OTHER PUBLICATIONS

"A co-boresighted synchronized ladar/EO imager for creating 3D images of dynamic scenes", source(s): Pack, Robert T. (Center for Advanced Imaging Ladar, Utah State University); Israelsen, Paul; Sealy, Kylee Source: proceedings of SPIE—The International Society for Optical Engineering, v 5791, Laser Radar Technology and Applications X, 2005, pp. 42-50.

(Continued)

*Primary Examiner* — Mary Cheung
*Assistant Examiner* — Rodney Butler
(74) *Attorney, Agent, or Firm* — Tarolli, Sundheim, Covell & Tummino LLP (57) ABSTRACT

Systems and methods are provided for locating threats to an aircraft that are located on the ground. Associated bearings from a sensor in an aircraft are determined for each of a plurality of detected shots from a threat at ground level. A sensor ground projection is plotted along each associated bearing. Each sensor ground projection is mapped to an elliptical uncertainty area reflecting the inherent error in bearing determining instrumentation. An estimation of the position for the threat based on the intersection points between mapped uncertainty areas of the sensor ground projections is calculated.

15 Claims, 5 Drawing Sheets

(56) References Cited

U.S. PATENT DOCUMENTS

2009/0173788 A1* 7/2009 Moraites et al. ............... 235/411
2010/0106752 A1* 4/2010 Eckardt et al. ................ 707/805
2010/0135120 A1* 6/2010 Cecala et al. ................. 367/129
2012/0176494 A1* 7/2012 Kamon et al. ................ 348/135

OTHER PUBLICATIONS

"A New Shot Boundary Detection Algorithm", Source(s): D Zhang, W Qi, HJ Zhang—research.microsoft.com.

* cited by examiner

GROUND THREAT LOCATION FOR AN AIRCRAFT USING BURST RECOGNITION

TECHNICAL FIELD

The present invention relates to electronic systems, and specifically relates to a ground threat location system for an aircraft.

BACKGROUND OF THE INVENTION

Aircraft are used in a wide variety of applications, both civilian and military, including travel, transportation, fire fighting, surveillance, and combat. Various aircraft have been designed to fill the wide array of functional roles defined by these applications, including balloons, dirigibles, traditional fixed wing aircraft, flying wings, and helicopters.

In general, aircraft travel at a sufficient altitude to substantially eliminate any threat posed to the aircraft from threats posed by personnel on the ground. For some applications, however, it is necessary to travel at comparably low altitudes for long periods of time, exposing the aircraft to threats from the ground. Similar exposure takes place in other applications during take-offs and landings of the aircraft.

SUMMARY OF THE INVENTION

In accordance with one aspect of the present invention a method is provided for locating threats to an aircraft that are located on the ground. Associated bearings from a sensor in an aircraft are determined for each of a plurality of detected shots from a threat at ground level. A sensor ground projection is plotted along each associated bearing. An estimation of the position for the threat based on the intersection points between sensor ground projections is calculated.

In accordance with another aspect of the present invention, a system is provided for locating threats to an aircraft that are located on the ground. A bearing determination element is configured to determine associated bearings from an aircraft for each of a plurality of detected shots from a threat at ground level. A position estimation element is configured to determine an estimated position for the threat for each of the plurality of detected shots. A position aggregation element is configured to calculate an improved estimated position for the threat based on an intersection between the estimated positions.

In accordance with yet another aspect of the present invention, a computer readable medium is provided for storing executable instructions that can be executed by a processor to locate threats to an aircraft that are located on the ground from sensor data. The executable instructions include a position estimation element configured to determine a plurality of estimated positions for a threat at ground level from the sensor data. A position aggregation element is configured to calculate an improved estimated position for the threat based on the intersection between the estimated positions.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DETAILED DESCRIPTION OF THE INVENTION

The present invention relates to systems and methods for locating threats located on the ground from an aircraft such that appropriate countermeasures can be taken. Visual or auditory sensors can be utilized to determine the bearing to the threat, i.e., the direction from the aircraft to the threat. In accordance with an aspect of the present invention, a larger number of bearings to the threat can be taken, for example, from each shot in a series of automatic gunfire. A sensor ground projection can be plotted along each bearing to generate an estimated position of the threat for each bearing, and an improved estimated position of the threat can be calculated based on the intersection points between the sensor ground projections.

Figure 1:
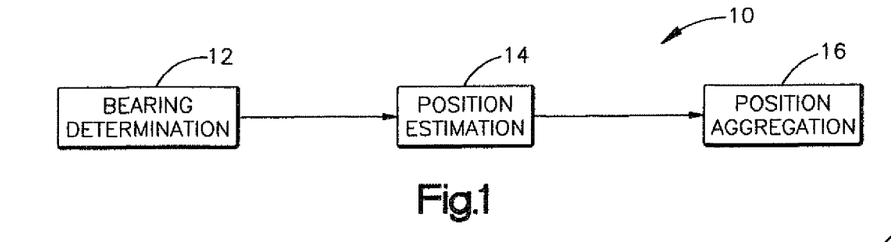
FIG. 1 illustrates a system for locating threats to an aircraft that are located on the ground in accordance with an aspect of the present invention.

FIG. 1 illustrates a system 10 for locating threats to an aircraft that are located on the ground in accordance with an aspect of the present invention. The system 10 includes a bearing determination element 12 that is configured to determine associated bearings from the aircraft to each of a plurality of detected shots from a threat at ground level. Specifically, the bearing determination element 12 identifies shots of weapon fire from the ground and determines the direction of incidence of light from a muzzle flash and/or a sonic disturbance from each shot. Accordingly, the bearing determination element 12 can include one or more sensor elements for detecting the light emitted by the shots, as well as appropriate circuitry or software for calculating the bearing from the aircraft to the detected shot.

Each sensor element has associated with it an inherent sensor error, i.e., a tolerance reflecting the accuracy with which the sensor detects light in one or more directions relative to the aircraft. Accordingly, the bearing detected and calculated by the sensor will be within a certain tolerance of the actual bearing of the shot from the aircraft in one or more directions, e.g., elevation, depth, and/or lateral or horizontal distance along the terrain relative to the aircraft.

The bearing detection element 12 can also receive input from other aircraft systems (not shown) indicating at least one of the position, velocity, and orientation of the aircraft, such that at least a relative position of the aircraft can be determined at the time each shot is detected. Accordingly, each shot can have an associated determined bearing and position of the aircraft.

A position estimation element 14 is configured to determine at least one estimated position for the threat. The position estimation element 14 first identifies a set of shots that represent a single burst of automatic weapon fire from a threat on the ground. This can be accomplished by grouping shots that are spatially and temporally proximate. For example, a series of shots can be identified as originating from a single burst when a group of shots are within a given degree of arc on the sensor, consecutive shots are separated by no more than a first threshold time period, and the entire burst has a time period less than a second threshold time period.

Once the position estimation element 14 identifies a single burst, the position estimation element plots a sensor ground projection along each calculated bearing associated with the identified single burst. The sensor ground projection is based upon the inherent sensor error of the sensor element, and may be projected as a two-dimensional area or a three-dimensional volume originating at the aircraft and centered about each associated bearing towards the threat. The position estimation element 14 then maps the sensor ground projection associated with each bearing into a two-dimensional uncertainty area overlying the threat and terrain. The position of the threat can be estimated from each uncertainty area, thereby providing a plurality of estimated positions of the location of the threat.

A position aggregation element 16 is configured to calculate an improved estimated position for the threat from the estimated positions. The position aggregation element 16 geographically overlays the uncertainty areas from all the sensor ground projections and calculates the spatial intersection points between the uncertainty areas to provide a more accurate estimate of the position. The position aggregation element 16 then determines the centroid or center of mass of the intersection points between overlaid uncertainty areas to provide an improved estimated position of the threat.

If desired, the position aggregation element 16 calculates a weight for each of the sensor ground projections as a function of the displacement between pairs of bearings associated with the shots used to calculate the position estimate. The position aggregation element 16 then calculates a weighted average of the estimated positions to provide a more accurate estimate of the position. In any case, the improved estimated position can be reported to an operator, along with a confidence value for the improved estimation, to allow appropriate countermeasures to the threat to be pursued.

Figure 2:
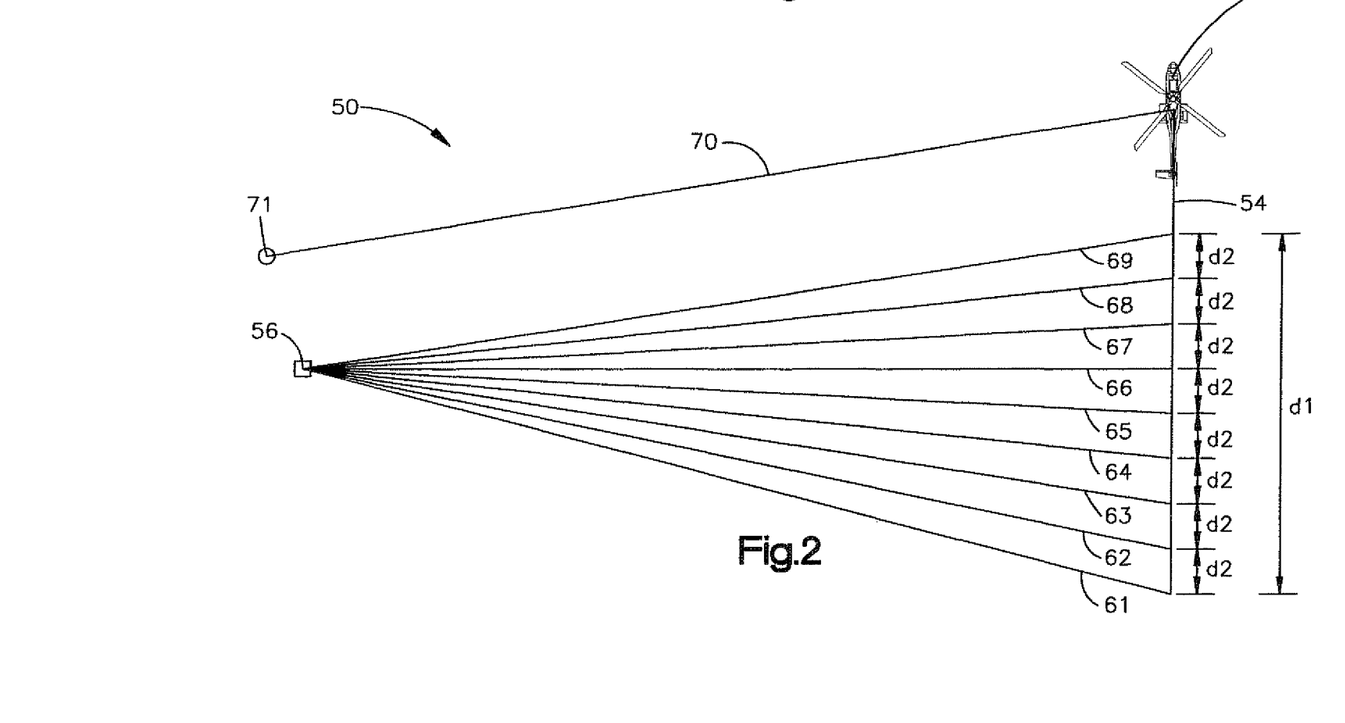
FIG. 2 illustrates a diagram of an aircraft utilizing a threat location system in accordance with an aspect of the present invention and a threat to the aircraft.

FIG. 2 illustrates a diagram 50 of an aircraft 52 utilizing a threat location system in accordance with an aspect of the present invention and a threat 56 to the aircraft. In the diagram, for the purpose of example, the aircraft 52 is assumed to be travelling at a constant velocity in a straight line, such that a displacement along a flight path 54 of the aircraft is functionally equivalent to the passage of a period of time. It will be appreciated, however, that the system constructed in accordance with the present invention is not limited to use in air travel at a constant velocity and that the system can include or be operatively connected to mechanisms for measuring both a current position of an aircraft and the passage of time. Furthermore, it will be appreciated that the flight path 54 of the aircraft 52 may be arcuate, multi-directional or otherwise non-linear and/or non-planar.

For each of a plurality of shots by the threat 56 at ground level, a bearing can be taken from the aircraft 52 to the threat. For example, a muzzle flash from a weapon used by the threat 56 can be imaged by the aircraft 52 or a sonic disturbance from the weapon can be sensed at a plurality of microphones and a bearing can be determined via time of arrival measurements. In accordance with an aspect of the present invention, the time interval between consecutive shots can be reviewed to determine which shots belong to a single burst of automatic weapon fire. By reviewing the shot timing, it is possible to discount data that might come from a different threat 71. Although the different threat 71 is illustrated as being spatially displaced from the threat 56, it will be appreciated that both threats could be positioned in close proximity with one another. In the illustrated diagram, the shots corresponding to the first nine bearings 61-69 occur within relatively short periods of time from one another, while the shot corresponding to the final bearing 70 occurs significantly later. This final shot and, thus, the final bearing 70, is removed from consideration in locating the threat 56. Although nine bearings 61-69 are illustrated, it will be appreciated that more or fewer bearings may be detected.

Each of the remaining bearings 61-69 associated with the threat 56 is separated by an associated distance $d_2$. Together, the distances $d_2$ between all consecutive pairs of bearings corresponds with a distance $d_1$, or baseline, of the flight path 54 over which the threat 56 is detected. Although the distance $d_2$ between each consecutive pair of bearings 61-69 is illustrated as being uniform, the distance between any two consecutive bearings could be the same as, or different from, any other pair of consecutive bearings.

Figure 3:
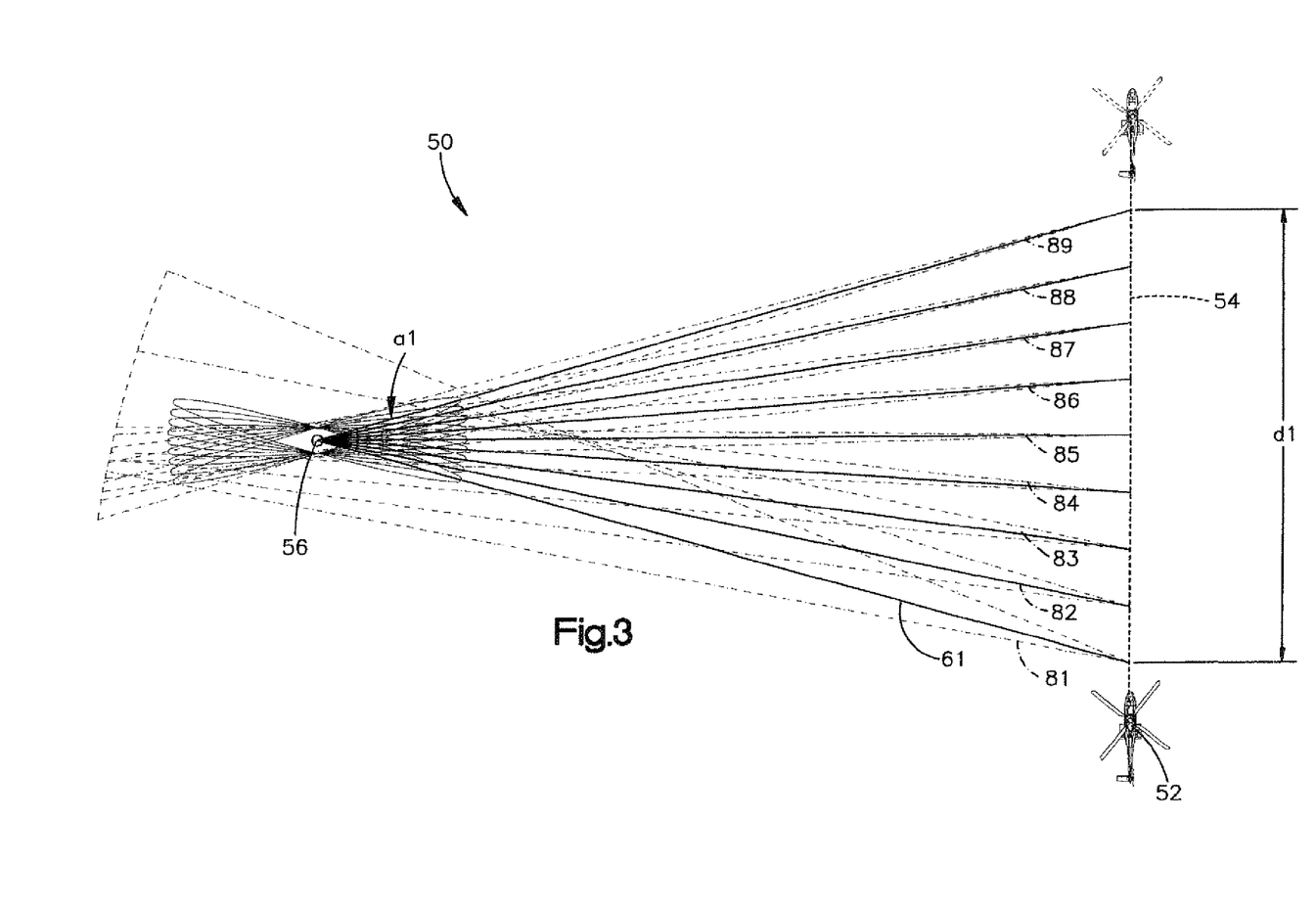
FIG. 3 illustrates a diagram of the aircraft utilizing the threat location system in accordance with an aspect of the present invention and a threat to the aircraft.

As shown in FIG. 3, the position estimation element 14 calculates an estimated position of the threat 56 from each of the bearings 61-69 along the baseline of the flight path 54. In particular, the position estimation element projects or plots a sensor ground projection toward the threat 56 and centered along each bearing 61-69. As noted, the sensor ground projection is an angular region defined by the inherent sensor error of the sensor(s) used to identify shots of weapon fire. The sensor error is the difference between the bearing detected and calculated by the sensor and the actual bearing of the threat 56.

This error may be expressed in two or three dimensions, corresponding to tolerances in elevation, depth, and/or lateral displacement, i.e., along each of the axis in three dimensions relative to the terrain. The sensor error may be uniform in each dimension or may be greater in one or more dimensions relative to the other dimension(s). For example, the sensor error may be $\pm 8°$ in the lateral or horizontal plane and $\pm 1°$ in the elevational plane, although more or less error in either or both planes will be appreciated.

Since the sensor ground projection is a reflection of the sensor error, the sensor ground projection may be a two dimensional area or a three dimensional volume. In an embodiment of the present invention, the sensor ground projection is a three dimensional cone having an elliptical cross-section reflecting the sensor error in the lateral or horizontal plane and the elevational plane relative to the terrain. Accordingly, the sensor ground projection 81 projected along the first bearing 61 is a conical volume having an elliptical base. In the previous example, sensor ground projection 81 would have a total angulation of 16° in the horizontal plane, i.e., in a plane parallel to the terrain, and a total angulation of 2° in the elevational plane, i.e., in a plane perpendicular to the terrain. The sensor ground projection 81 is centered on the first bearing 61 such that the projection extends over the threat 56. Since the aircraft 52 may be flying at an elevation higher than the target 52, the bearing and, thus, the sensor ground projection 81 may be angled relative to the terrain.

Figures 4A, 4B:
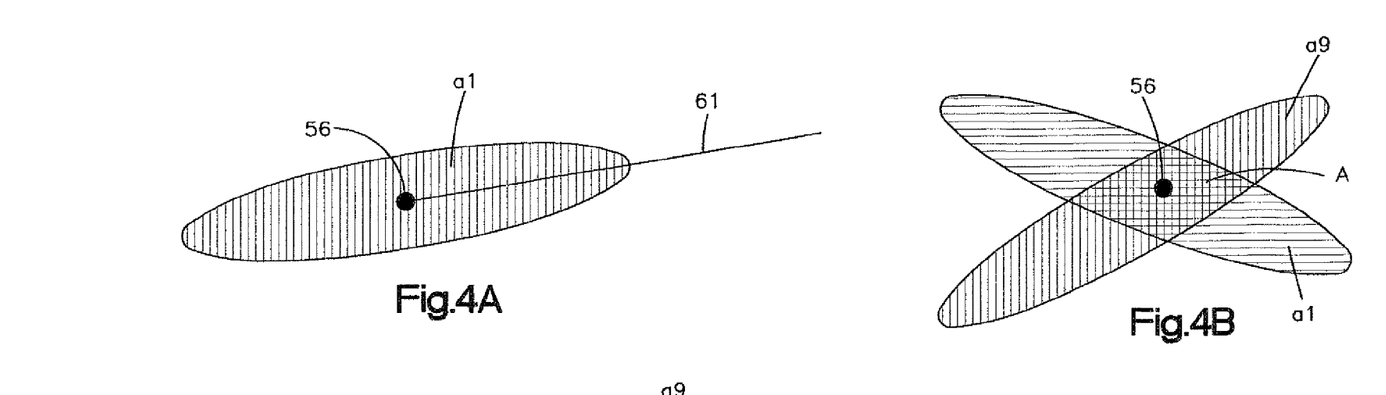
FIG. 4A illustrates estimating a position of the threat in an accordance with the present invention.
FIG. 4B illustrates calculating an improved estimation position of the threat based on estimated positions of the threat.

The three dimensional sensor ground projection 81 is mapped by the position estimation element 14 to a two dimensional threat detection uncertainty area $a_1$ over the terrain and generally about the threat 56 (see FIG. 4A). The uncertainty area $a_1$, therefore, is not a separate entity from the sensor ground projection, but rather an alternative representation of the sensor ground projection. The uncertainty area $a_1$ defines estimated positions of the threat 56 based on the bearing 61 and the sensor error, embodied by the sensor ground projection 81. Since the sensor ground projection 81 exhibits an elliptical cross-section based on the non-uniform sensor error across multiple dimensions, the two dimensional uncertainty area $a_1$ also exhibits an elliptical profile. Although the uncertainty area $a_1$ is illustrated as being centered about the threat 56, it will be appreciated that since the position estimation element 14 is, in fact, estimating the position of an object it does not know the exact location of, the position estimation element may likewise map the uncertainty area onto the terrain such that the threat is actually closer to one side and/or the boundary of the uncertainty area $a_1$.

The position estimation element 14 likewise plots a sensor ground projection 82-89 over each of the remaining bearings 62-69 associated with the identified burst (FIG. 3). As with the projection 81, each projection 82-89 is mapped to a corresponding two dimensional uncertainty area $a_1$-$a_9$ positioned on the threat 56. Since each uncertainty area $a_1$-$a_9$ provides an estimation of the position of the threat 56 based on each bearing 62-69, the uncertainty areas provide a plurality of estimations of the position of the threat along the baseline of the flight path 54.

In accordance with the present invention, an improved estimation of the position of the threat 56 can be determined from the plurality of estimated positions defined by the uncertainty areas $a_1$-$a_9$. Since the sensor ground projections 81-89 are plotted along each of the bearings 61-69 towards the same target 56, there is spatial overlap between projections across three dimensions. There is likewise spatial and, thus, geographic overlap between the mapped, two dimensional uncertainty areas $a_1$-$a_9$. This overlap is reflected by the points at which the uncertainty areas $a_1$-$a_9$ intersect one another. One example of this principle is illustrated in FIG. 4B in which the uncertainty area $a_1$ mapped from the sensor ground projection 81 plotted along the bearing 61 overlaps the uncertainty area $a_9$ mapped from the sensor ground projection 89 plotted along the bearing 69.

The overlap of the uncertainty areas $a_1$ and $a_9$ defines the points at which the areas intersect one another, represented by the shaded region A in FIG. 4B. This intersection region A, therefore, has a higher density of mapped points per unit of terrain than either of the uncertainty areas $a_1$-$a_9$. Since each uncertainty area $a_1$ and $a_9$ also provides an estimated position for the threat 56, the intersection region A between the uncertainty areas provides an improved estimated position of the threat. In particular, the intersection region A represents a region that both the uncertainty area $a_1$ and the uncertainty area $a_9$ estimate the position of the threat 56 to be in. Since the intersection region A is smaller than either of the uncertainty areas $a_1$ and $a_1$, the intersection region defines a narrower range of estimated positions of the threat 56 and, thus, represents an improved estimated position of the threat.

Figure 5A:
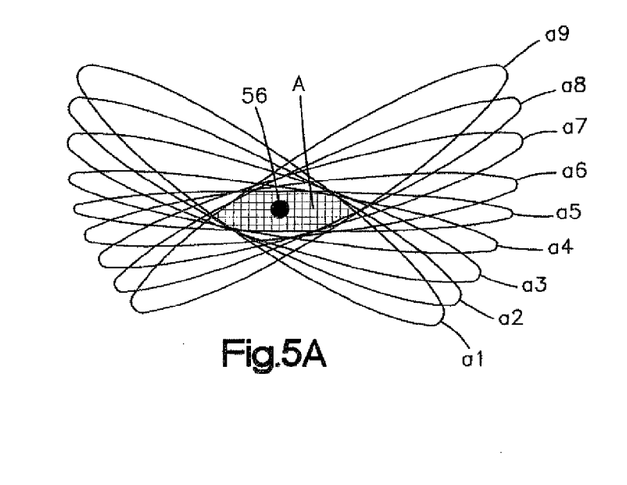
FIG. 5A illustrates calculating an improved estimation position of the threat based on estimated positions of the threat without noise.

As shown in FIG. 5A, by overlapping the uncertainty area $a_1$-$a_9$ associated with each sensor ground projection 81-89, the intersection region A common to all—or the most—uncertainty areas can be obtained. This intersection region A will have the highest density of mapped points per unit of terrain relative to any other portion of the overlaid uncertainty areas. An increase the number of bearings taken along the baseline of the flight path 54 and, therefore, the number of sensor ground projections plotted increases the number of uncertainty areas generated. When more uncertainty areas are present, the intersection region common to all of them becomes increasingly smaller and, thus, defines a narrower range of estimated positions of the threat. This narrower range of estimated positions, in turn, reflects a more accurate improved estimation of the position of the threat 56.

Furthermore, bearings taken over a baseline having a distance greater than the distance $d_1$ will generate a more accurate improved estimated position than a baseline having a distance shorter than the distance $d_1$. This correlation between baseline length and position estimation accuracy is based on the premise that, as the bearings are spread farther apart across a longer baseline, the angulation between the bearings becomes more severe. Accordingly, the uncertainty areas corresponding to those bearings are likewise more angled relative to one other, thereby decreasing the degree of intersection between them. This, in turn, results in a smaller intersection region A and therefore a more accurate estimated position of the threat. Regardless of the makeup of the baseline, when the intersection region A has been generated from the uncertainty areas, a center of mass calculation is performed on the intersection region to obtain a single improved estimated position for the threat 56.

Before or during the center of mass calculation of the intersection region A, the position aggregation element 16 may remove portions of the uncertainty areas that do not intersect one another. This removal may be performed sequentially as each uncertainty area is overlaid consecutively onto the other. Alternatively, the position aggregation element 16 may overlay all of the uncertainty areas before removing all of the non-overlying portions. In any case, by removing the non-overlying portions of the uncertainty areas, the position aggregation element 16 is able to more quickly calculate the center of mass of the remaining intersection region to generate the single improved estimated position of the threat 56.

Figure 5B:
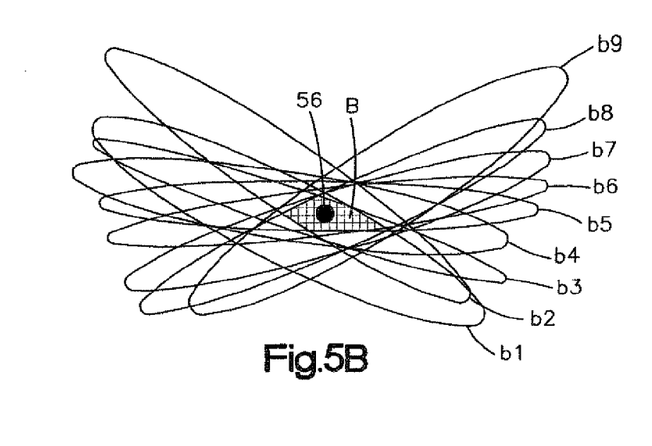
FIG. 5B illustrates calculating an improved estimation position of the threat based on estimated positions of the threat with noise.

FIG. 5B illustrates an aspect of the present invention where the aircraft 52 and, thus, the sensor(s) that detect and calculate bearings experience noise. Noise is the result of normal vibration of the aircraft 52 during flight. Under the influence of noise, each bearing does not originate from the exact same spot on the aircraft. Accordingly, each sensor ground projection and corresponding uncertainty area $b_1$-$b_9$ is offset from one another. The noise, however, does not affect the ability of the position aggregation element 16 to overlay the uncertainty areas $b_1$-$b_9$ and calculate an intersection region B between the uncertainty areas, thereby obtaining an improved estimated position of the threat 56. As with the intersection region A between uncertainty areas $a_1$-$a_9$ in the absence of noise, a center of mass calculation is performed on the intersection region B between uncertainty areas $b_1$-$b_9$ under the influence of noise to obtain a single improved estimated position for the threat 56.

Figure 6:
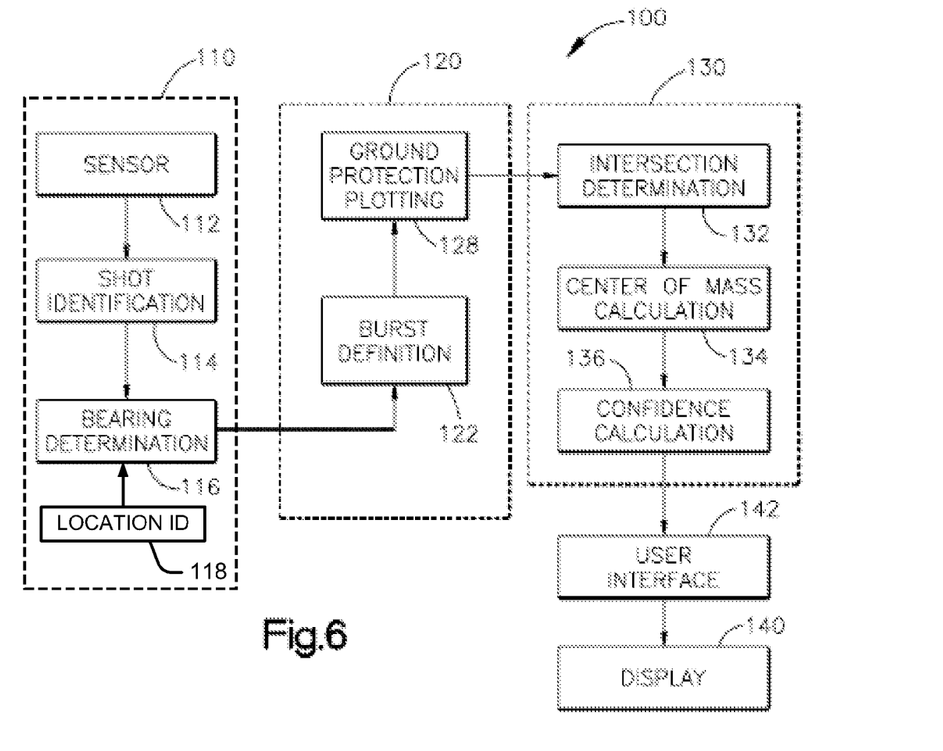
FIG. 6 illustrates an exemplary threat location system for locating threats to an aircraft that are located on the ground.

FIG. 6 illustrates an exemplary threat location system 100 for locating threats to an aircraft that are located on the ground. The system includes a bearing determination element 110 that is configured to determine associated bearings from an aircraft for each of a plurality of detected shots from a threat at ground level. The bearing determination element 110 includes a sensor 112 that detects weapon fire from the ground. For example, the sensor 112 can include one or more image sensors that detect light in one or both of the visible spectrum and the infrared spectrum. A shot identification element 114 is configured to receive data from the sensor 112 and identify shots within the sensor data. The shot identification element 114 can also identify respective associated times of the identified shots.

A bearing determination element 116 is configured to determine an associated bearing from the aircraft for each identified shot. In one implementation, one or more images associated with each shot can be analyzed to determine a bearing to the shot from the aircraft from the known properties of one or more image sensors and the position of the shot within each image. A location determination element 118 is configured to determine a relative location of the aircraft at the associated time of each shot. The location determination element 118 can include, for example, a GPS assembly, an operative connection to a GPS assembly associated with the aircraft, or an operative connection with one or more other aircraft systems to continuously provide velocity and heading updates to the system 100.

The system further includes a position estimation element 120 that is configured to determine a plurality of estimated positions for the threat from the plurality of bearings. A burst definition element 122 is configured to identify a series of shots representing a single burst of shots from an automatic weapon. A series of shots can be reviewed to determine intershot intervals between consecutive shots in the series. In the illustrated implementation, a series of shots having a regular intershot interval can be labeled as a single burst. Alternatively, shots that are spatially and temporally proximate can be grouped, with a group being defined when a series of shots are within a given degree of arc of the sensor, consecutive shots are separated by no more than a first threshold time period, and the entire series has a time period less than a second threshold time period.

A sensor ground projection element 128 is configured to calculate an estimated position for each bearing within the identified burst by plotting a sensor ground projection along each bearing and mapping the projection over the terrain to an uncertainty area positioned about the threat. Each of the uncertainty areas defines the range of estimated positions for the threat.

The plurality of estimated positions can be provided to a position aggregation element 130 that is configured to calculate an improved estimated position for the threat from the estimated positions. An intersection determination element 132 is configured to overlay the uncertainty areas from each sensor ground projection and calculate the intersection points between the overlaid uncertainty areas. The intersection determination element 132 may remove portions of the uncertainty areas that do not overlap one another in a sequential manner as each subsequent uncertainty area is overlaid on to the prior overlaid areas or cumulatively once all uncertainty areas have been overlied.

A weight determination element (not shown) may also be provided and is configured to calculate a weight value for each intersection region as a function of the distance between the points at which the bearings were obtained—referred to herein as the interbearing distance—that corresponds to the uncertainty areas having the intersection region. In one implementation, different pairs of bearings associated with the burst are selected and uncertainty areas are mapped along those selected bearing pairs to calculate intersection regions for each pair. This may be repeated until all possible bearing pairs associated with the single burst are exhausted. The weight determination element then assigns a weight to each intersection region according to the interbearing distance of the bearing pair associated with that intersection region. The plurality of weighted intersection regions is then spatially summed to generate an improved estimated position of the threat.

Referring to FIG. 2, since each interbearing distance is the distance $d_2$, each uncertainty area will have the same weight value. It will be appreciated, however, that if the interbearing distance between any two bearings is greater or less than the distance $d_2$, the weight value for the uncertainty area associated with that bearing will be adjusted accordingly.

The position aggregation element 130 can further include a center of mass calculation element 134 that calculates the centroid or center of mass of the intersection region A (without noise) or the intersection region B (with noise) to obtain a single improved estimated position of the threat 56.

The position aggregation element 130 can further include a confidence calculation element 136 that calculates a confidence measure for the improved estimation of the threat position. For example, a standard deviation associated with the weighted average of each uncertainty area can be calculated, and from this value, a desired confidence range (e.g., 95%) can be determined. The improved estimation of the position, along with the calculated confidence, can be displayed to a user at an associated display 140 via a user interface 142. The user can then initiate any appropriate countermeasures to the threat based on the determined position of the threat and the confidence in that position.

Figure 7:
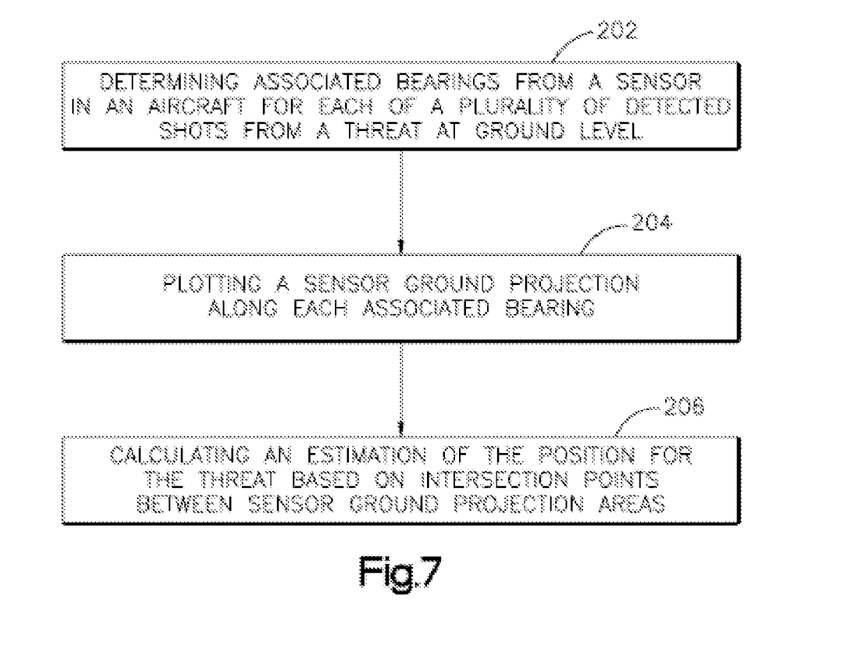
FIG. 7 illustrates a method for locating threats to an aircraft that are located on the ground in accordance with an aspect of the present invention.

In view of the foregoing structural and functional features described above, a methodology in accordance with various aspects of the present invention will be better appreciated with reference to FIG. 7. While, for purposes of simplicity of explanation, the methodology of FIG. 7 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 7 illustrates a method 200 for locating threats to an aircraft that are located on the ground in accordance with an aspect of the present invention. At 202, associated bearings are determined from the aircraft for each of a plurality of detected shots from a threat at ground level. This can be accomplished through analysis of electromagnetic radiation or sonic disturbances from the shots detected at an appropriate sensor. At 204, a sensor ground projection is plotted along each associated bearing and an uncertainty area is mapped from the sensor ground projection over the threat and along the terrain to obtain a plurality of estimated positions for the threat. At 206, an improved estimated position for the threat can be determined from the intersection points between overlaid sensor ground projections along each of the associated bearings. A confidence measure associated with the calculated improved estimation can be calculated (not shown). For example, the confidence measure can include a ninety-five percent confidence range around the improved estimation of the threat position.

Figure 8:
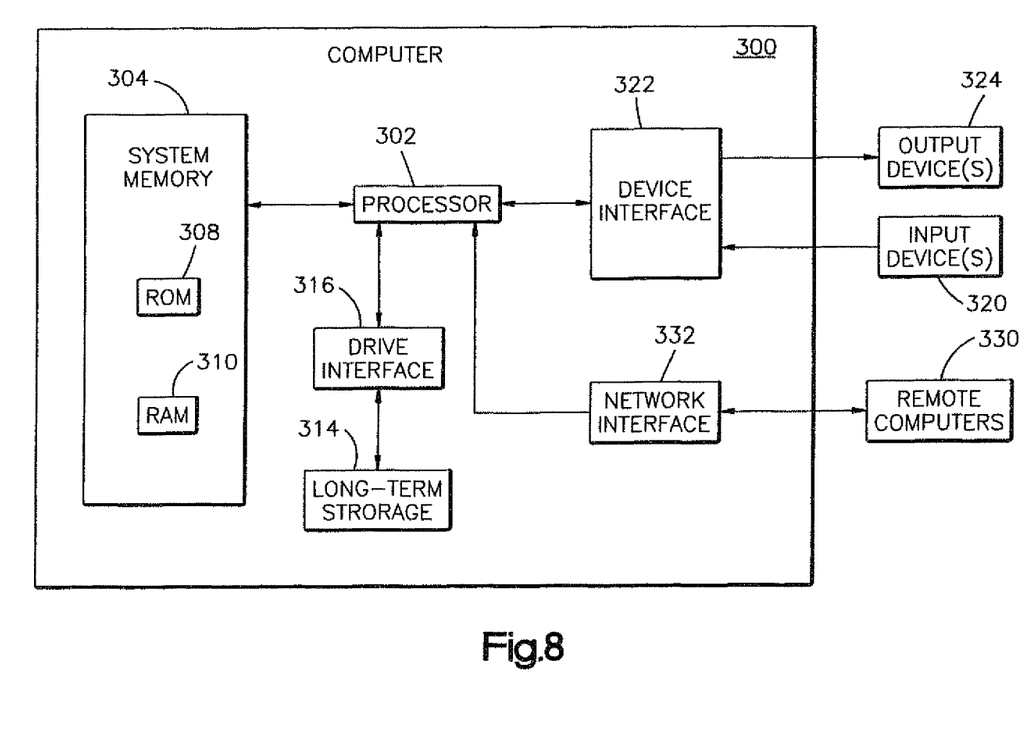
FIG. 8 illustrates a computer system that can be employed to implement systems and methods described herein, such as based on computer executable instructions running on the computer system.

FIG. 8 illustrates a computer system 300 that can be employed to implement systems and methods described herein, such as based on computer executable instructions running on the computer system. The computer system 350 can be implemented on one or more general purpose networked computer systems, embedded computer systems, routers, switches, server devices, client devices, various intermediate devices/nodes and/or stand alone computer systems. Additionally, the computer system 300 can be implemented as part of the computer-aided engineering (CAE) tool running computer executable instructions to perform a method as described herein.

The computer system 300 includes a processor 302 and a system memory 304. Dual microprocessors and other multiprocessor architectures can also be utilized as the processor 350. The processor 302 and system memory 304 can be coupled by any of several types of bus structures, including a memory bus or memory controller, a peripheral bus, and a local bus using any of a variety of bus architectures. The system memory 304 includes read only memory (ROM) 308 and random access memory (RAM) 310. A basic input/output system (BIOS) can reside in the ROM 308, generally containing the basic routines that help to transfer information between elements within the computer system 300, such as a reset or power-up.

The computer system 300 can include one or more types of long-term data storage 314, including a hard disk drive, a magnetic disk drive, (e.g., to read from or write to a removable disk), and an optical disk drive, (e.g., for reading a CD-ROM or DVD disk or to read from or write to other optical media). The long-term data storage can be connected to the processor 302 by a drive interface 316. The long-term storage components 314 provide nonvolatile storage of data, data structures, and computer-executable instructions for the computer system 300. A number of program modules may also be stored in one or more of the drives as well as in the RAM 310, including an operating system, one or more application programs, other program modules, and program data.

A user may enter commands and information into the computer system 300 through one or more input devices 320, such as a keyboard or a pointing device (e.g., a mouse). These and other input devices are often connected to the processor 302 through a device interface 322. For example, the input devices can be connected to the system bus by one or more a parallel port, a serial port or a universal serial bus (USB). One or more output device(s) 324, such as a visual display device or printer, can also be connected to the processor 302 via the device interface 322.

The computer system 300 may operate in a networked environment using logical connections (e.g., a local area network (LAN) or wide area network (WAN) to one or more remote computers 330. A given remote computer 330 may be a workstation, a computer system, a router, a peer device or other common network node, and typically includes many or all of the elements described relative to the computer system 300. The computer system 300 can communicate with the remote computers 330 via a network interface 332, such as a wired or wireless network interface card or modem. In a networked environment, application programs and program data depicted relative to the computer system 300, or portions thereof, may be stored in memory associated with the remote computers 330.

It will be understood that the above description of the present invention is susceptible to various modifications, changes and adaptations, and the same are intended to be comprehended within the meaning and range of equivalents of the appended claims. The presently disclosed embodiments are considered in all respects to be illustrative, and not restrictive. The scope of the invention is indicated by the appended claims, rather than the foregoing description, and all changes that come within the meaning and range of equivalence thereof are intended to be embraced therein.

Having described the invention, we claim the following:

1. A method for locating threats to an aircraft that are located on the ground, comprising:
    determining associated bearings from a sensor in an aircraft for each of a plurality of detected shots from a threat at ground level;
    plotting a sensor ground projection along each associated bearing;
    eliminating portions of each sensor ground projection that does not intersect at least one other sensor ground projection; and
    calculating an estimation of the position for the threat based on the intersection points between sensor ground projections.

2. The method of claim 1, wherein plotting a sensor ground projection comprises plotting a sensor ground projection having a threat detection uncertainty area.

3. The method of claim 1, wherein plotting a sensor ground projection along each associated bearing comprises plotting a two dimensional projection.

4. The method of claim 1, wherein plotting a sensor ground projection along each associated bearing comprises plotting a three dimensional projection.

5. The method of claim 1, further comprising calculating a confidence measure associated with the calculated estimation of the position for the threat.

6. The method of claim 1, wherein calculating the estimation of the position for the threat comprises locating an area having the highest density of plotted ground projections.

7. The method of claim 1, wherein calculating the estimation of the position for the threat comprises determining the center of mass of the intersection points between sensor ground projections.

8. A system for locating threats to an aircraft that are located on the ground, comprising:
    a bearing determination element configured to determine associated bearings from an aircraft for each of a plurality of detected shots from a threat at ground level;
    a position estimation element configured to determine an estimated position for the threat for each of the plurality of detected shots and map a two-dimensional uncertainty area around each estimated position, an extent of the uncertainty area being a function of an inherent sensor error of a sensor associated with the bearing detection element; and
    a position aggregation element configured to calculate an improved estimated position for the threat based on an overlapping regions of the uncertainty areas associated with the estimated positions.

9. The system of claim 8, the position estimation element comprising a burst definition element configured to identify a series of shots representing a single burst of shots from an automatic weapon.

10. The system of claim 8, the bearing determination element comprising:
    a shot identification element configured to receive data from an associated sensor and identify shots and respective associated times of the shots from the sensor data;
    a bearing determination element configured to determine an associated bearing from the aircraft for each identified shot; and
    a location determination element configured to determine a relative location of the aircraft at the associated time of each shot.

11. The system of claim 10, wherein the sensor comprises an image sensor that detects light in one of the visible spectrum and the infrared spectrum.

12. The system of claim 8, wherein the position aggregation element calculates the improved estimated position for the threat by calculating the center of mass of the overlapping regions of the uncertainty areas.

13. A system for locating threats to an aircraft that are located on the ground from sensor data, the executable instructions comprising:
- a position estimation element configured to determine a plurality of estimated positions for a threat at ground level from the sensor data, plot a sensor ground projection along each associated bearing, and eliminate portions of each sensor ground projection that does not intersect at least one other sensor ground projection; and
- an position aggregation element configured to calculate an improved estimated position for the threat based on an intersection between the estimated positions.

14. The system of claim 13 further comprising:
- a shot identification element configured to receive data from an associated sensor and identify shots and respective associated times of the shots from the sensor data;
- a bearing calculator configured to determine an associated bearing from the aircraft for each identified shot; and
- a location determination element configured to determine a relative location of the aircraft at the associated time of each shot.

15. The system of claim 13, further comprising a user interface configured to provide the improved estimated position for the threat to an associated display for display to a user.

* * * * *